United States Patent [19]

Hansen

[11] Patent Number: 4,958,297

[45] Date of Patent: Sep. 18, 1990

[54] APPARATUS FOR INTERFACING VIDEO INFORMATION AND COMPUTER-GENERATED GRAPHICS ON A VISUAL DISPLAY TERMINAL

[75] Inventor: James K. Hansen, Minnetrista, Minn.

[73] Assignee: Honeywell Inc., Minneapolis, Minn.

[21] Appl. No.: 887,901

[22] Filed: Jul. 17, 1986

[51] Int. Cl.[5] .............................................. G06F 15/42

[52] U.S. Cl. .................................... 364/518; 340/747; 29/712

[58] Field of Search ............... 364/518, 521, 468, 478; 434/365, 366, 429; 29/712; 340/706, 747, 703

[56] References Cited

U.S. PATENT DOCUMENTS

| | | | |
|---|---|---|---|
| 4,091,550 | 5/1978 | Schrenk et al. | 434/366 |
| 4,202,037 | 5/1980 | Glaser et al. | 364/518 |
| 4,587,633 | 5/1986 | Wang et al. | 364/900 |
| 4,598,459 | 7/1986 | Klink et al. | 29/564.8 |
| 4,670,974 | 6/1987 | Antoszewski et al. | 29/701 |
| 4,672,459 | 6/1987 | Kudo | 358/257 |
| 4,686,521 | 8/1987 | Beaven et al. | 340/748 |
| 4,710,873 | 12/1987 | Bieslow et al. | 364/410 |
| 4,718,025 | 1/1988 | Minou et al. | 364/518 |
| 4,738,022 | 4/1988 | Sakamoto et al. | 29/712 |
| 4,747,198 | 5/1988 | Asai et al. | 29/407 |

*Primary Examiner*—Gary V. Harkcom
*Assistant Examiner*—Phu K. Nguyen
*Attorney, Agent, or Firm*—Orrin M. Haugen; Thomas J. Nikolai; Frederick W. Niebuhr

[57] ABSTRACT

A system and circuit for selectively presenting to a display terminal information obtained from a video camera and from a computer terminal so that computer generated graphics information can be superimposed with the camera picture on the face of a display screen. An interface adapter circuit is coupled to the computer's address and data buses and is used to drive a video mixing switch to provide a computer monitor with either computer generated graphics or video information originating at a video camera, with synchronization for the camera provided by the computer terminal.

4 Claims, 2 Drawing Sheets

APPARATUS FOR INTERFACING VIDEO INFORMATION AND COMPUTER-GENERATED GRAPHICS ON A VISUAL DISPLAY TERMINAL

BACKGROUND OF THE INVENTION

I. Field of Invention:

This invention relates generally to visual display apparatus, and more particularly to a system for presenting both video camera generated information and computer terminal originated data on the display face of a video monitor.

II. Discussion of the Prior Art:

In facilitating the production of electronic circuit assemblies by relatively inexperienced personnel, it has been the practice for a production engineer to first work up an assembly procedure which generally comprise step-by-step instructions of the order in which parts are to be assembled to, say, a printed circuit board, giving an identification of the component and the location on the board where that component is to be inserted. These procedures are furnished to the assembly personnel who are positioned at a work station at which all of the component parts are located in suitable trays or bins and, while reading the assembly procedure prepared by the production engineer, undertake to follow those instructions.

Following the assembly operation, the parts are typically delivered to a test or quality control department where inspection takes place. Here, an inspector will test the device as produced by the assembler and will note on an inspection report those components or areas on the board where a problem exists as well as the nature of the problem and the recommended rework steps to be performed. The defective part along with the inspector's report will then be returned to the assembly department where, again, assembly personnel are expected to make the various corrections identified in the inspection report. The process repeats until a product meeting specifications is produced.

SUMMARY OF THE INVENTION

It has been envisioned that the manufacturing and testing along with rework of mechanical and electrical assemblies and subassemblies can be expedited using relatively inexpensive personal computer terminals. Here, the production engineer would first cause to be stored on a suitable computer readable medium, e.g., a hard disk memory, a program which can be addressed using the part number for the assembly or subassembly and which would present to the assembler at the work station a display of a set of instructions concerning the order in which individual components are to be added to the device being assembled and an identifier for the particular bin from which the component part is to be selected. In addition, it is desirable that the system display to the assemblers the precise location where the component is to be added. Any special instructions, such as how to form the leads on electrical components, how to orient components having polarity markings, etc., may also be prestored on the recording media.

In implementing the electronic system thus far described, located at each work station is a video camera, a small, relatively low-cost personal computer, a video monitor and means for interfacing the video camera and the computer to the monitor. In actually implementing the present system, Apple IIe personal computers were utilized, but other similar personal computers can also be used. The video camera is positioned relative to the workpiece in an identical fashion at each work station so that, assuming that the cameras are set at the same magnification, the picture presented on the monitor at each work station would generally be the same. The camera is focused on the part being assembled and means are provided for selectively switching the input to the minotor from the computer as a source or from both the camera and the computer as a source. By mixing of the camera and computer sources, it will appear to the human observer as if the graphics information from the computer terminal is superimposed upon the data (picture) obtained from the video camera. This, of course, can be used to facilitate the location where the next operation by the assembler is to take place. For example, a cross-hair, cursor generated by the computer and prestored on the computer recording media, can be effectively superimposed upon the presentation being picked up by the video camera to locate a precise coordinate on the part being assembled where the next component is to be added.

In an inspection and rework mode, an inspector, also having the same suite of equipment as his work site, may call up an inspection procedure for the mass storage device for a given assembly or subassembly by entering in on the keyboard of the personal computer the part number for the device to be inspected. This would be used to address an inspection procedure previously written by the quality engineer and stored in the hard disk memory device accessible by all of the computers used in the system. The inspector would then follow that procedure, recording the part number and serial number of the assembly being inspected, and the location and information concerning any type of defect which might be noted. This information relating to a defect is then automatically stored on the hard disk storage device for that part number.

Once that inspection operation has been completed, the subassembly in question is passed on to a rework operator who is in a position to call up the rework program which, too, had been prewritten by the production engineer. The rework operator is thus prompted to type in the serial number of the assembly being reworked and, as a result, a program is initiated which retrieves data stored on the hard disk device relating to the part to be reworked. The program then steps the operator through the rework procedure, instructing him or her to rework the defect earlier detected in accordance with the data preveiously stored by the inspector.

OBJECTS

It is accordingly a principal object of the present invention to provide an improved system for facilitating the manufacture and testing of products.

Another object of the invention is to provide an apparatus and method for facilitating the manufacture and testing of products by relatively untrained personnel.

Yet another object of the invention is to provide an automated system for providing step-by-step instructions to assembly and inspection personnel whereby various mechanical and/or electrical products can be reliably produced.

Yet a further object of the invention is to provide a personal computer-based system which allows the display of computer generated data and video camera generated data on a video monitor.

These and other objects and advantages of the invention will become apparent to those skilled in the art from the following detailed description of a preferred embodiment especially when considered in conjunction with the accompanying drawings in which like numerals in the several views refer to corresponding parts.

DESCRIPTION OF THE PREFERRED EMBODIMENT

Figure 1:
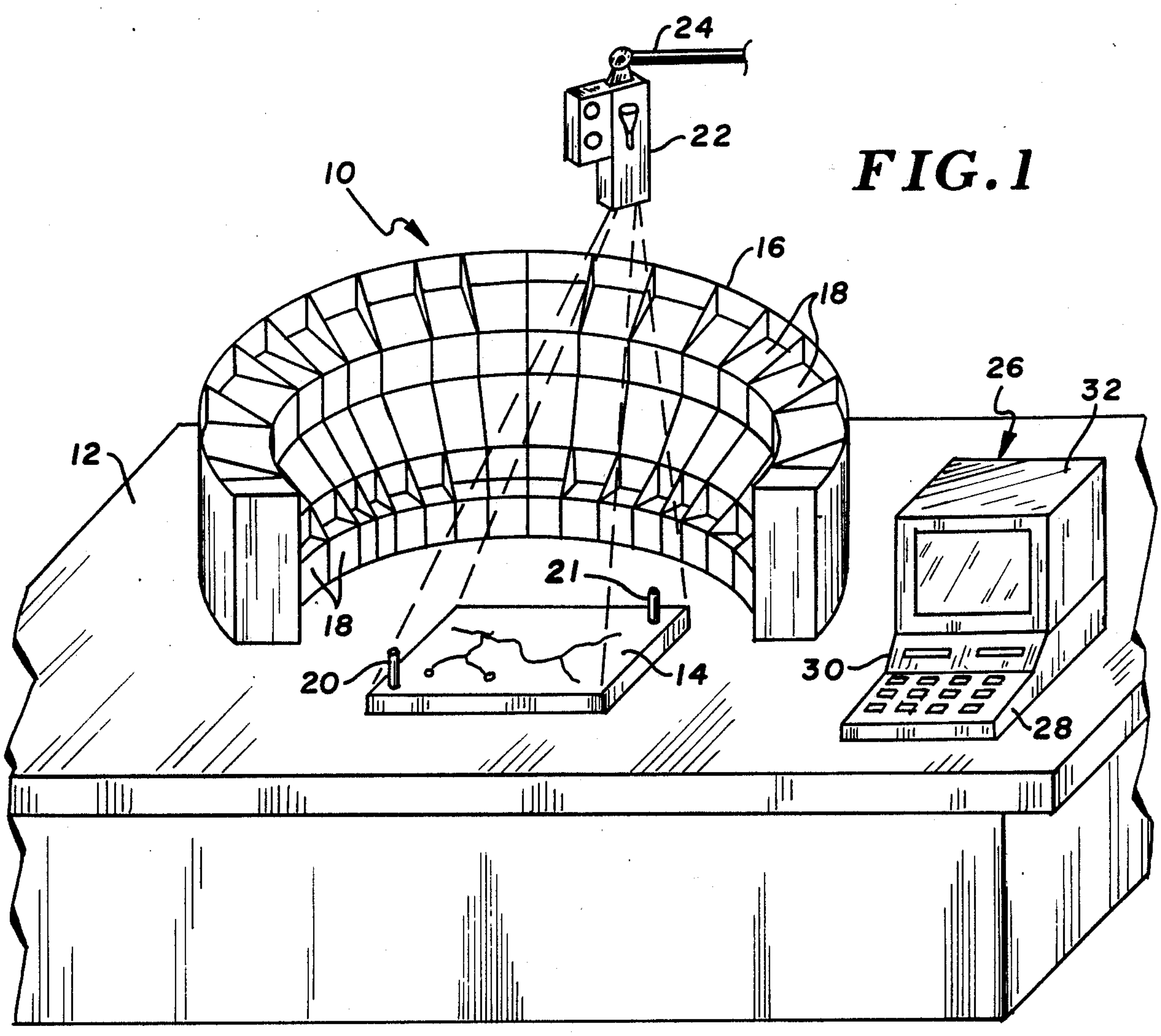
FIG. 1 is a perspective view of an assembler's work station embodying the present invention.

Referring to the perspective drawing of FIG. 1, there is shown one of several work stations to be used in a factory by assembly and/or inspection personnel in the production of a product comprised of individual component parts. Each work station 10 is seen to include a bench or table 12 on which is positioned a workpiece, such as a printed circuit board 14, to which various electrical components are to be assembled. It is to be understood, however, that while the invention is to be explained in conjunction with the performance of an electrical assembly, inspection, and rework operations, no limitation is intended in that the same method and apparatus can be used in assembly of wholly mechanical devices or electromechanical devices as well.

Also positioned on the table 12 is a component parts storage device 16 having a plurality of individual trays or bins 18 arranged within easy reaching distance of the operator. The individual trays or bins 18 would each contain a supply of the different parts necessary for producing the finished printed circuit board assembly 14.

The board or subassembly 14 is placed in a predetermined position on the tabletop 12 established by the indexing pins 20 and 22 affixed to the table. Positioned above the work surface 12 and in a position to view the board 14 is a video camera 22 which is suitably suspended from an arm 24 so as to be in a fixed, aligned registration with the indexing pins 20 and 22. Thus, the subassemmbly 14 is always positioned in a fixed orientation relative to the video camera 22.

Also suitably positioned on the work surface 12 is a relatively low-cost personal computer system, here indicated generally by numeral 26. As mentioned, the well-known and widely used Apple IIe computer is well suited and cost effective in this application. The system is seen to include a computer/keyboard module 28, a floppy disk drive 30 and a suitable display device, such as a CRT video monitor 32. The personal computer system 26 is positioned so that the display surface of the monitor 32 is readily viewable by the operator.

As will be explained in greater detail hereinbelow, both the computer module/keyboard 28 and the video camera 22 are suitably interfaced with the video monitor 32 such that both video information from the camera 22 and alpha/numeric and graphics information from the computer/keyboard moldule 28 can be presented simultaneously on the face of the monitor.

Figure 2:
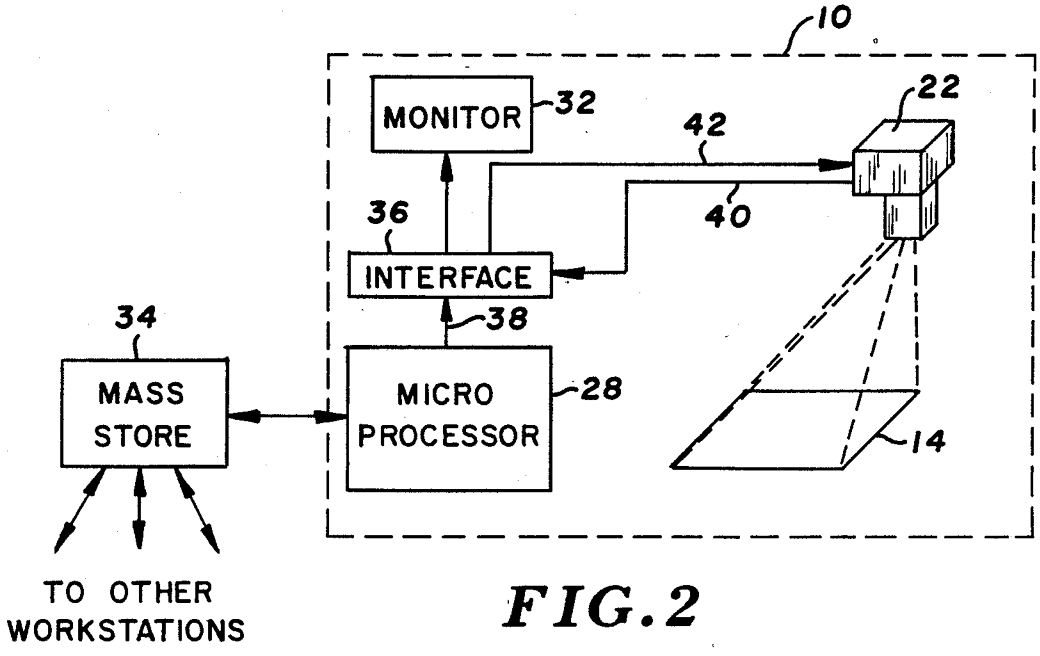
FIG. 2 is a block diagram of the hardware for implementing the microprocessor-based product assembly-/inspection work station.

As is illustrated in FIG. 2, the microprocessor 28 is also coupled to a mass storage device 34 which may, for example, be a hard disk of the type capable of typically storing 10 megabytes of information at addressable locations thereon. The mass storage device 34 may be shared between a plurality of microprocessors, each located at different work stations.

The interface device 36 is coupled to an output port 38 of the microprocessor 28 and to the video camera 22 by means of cables 40 and 42. The cable 40 is arranged to carry the video signals originating at the camera 22 to the interface circuit 36 and thence to the monitor. The cable 42, on the other hand, allows the horizontal and vertical sync signals originating within the microporcessor to be fed to the video camera 22. In this fashion, the video information and the raster scan of the monitor 32 remain synchronized.

Figure 3:
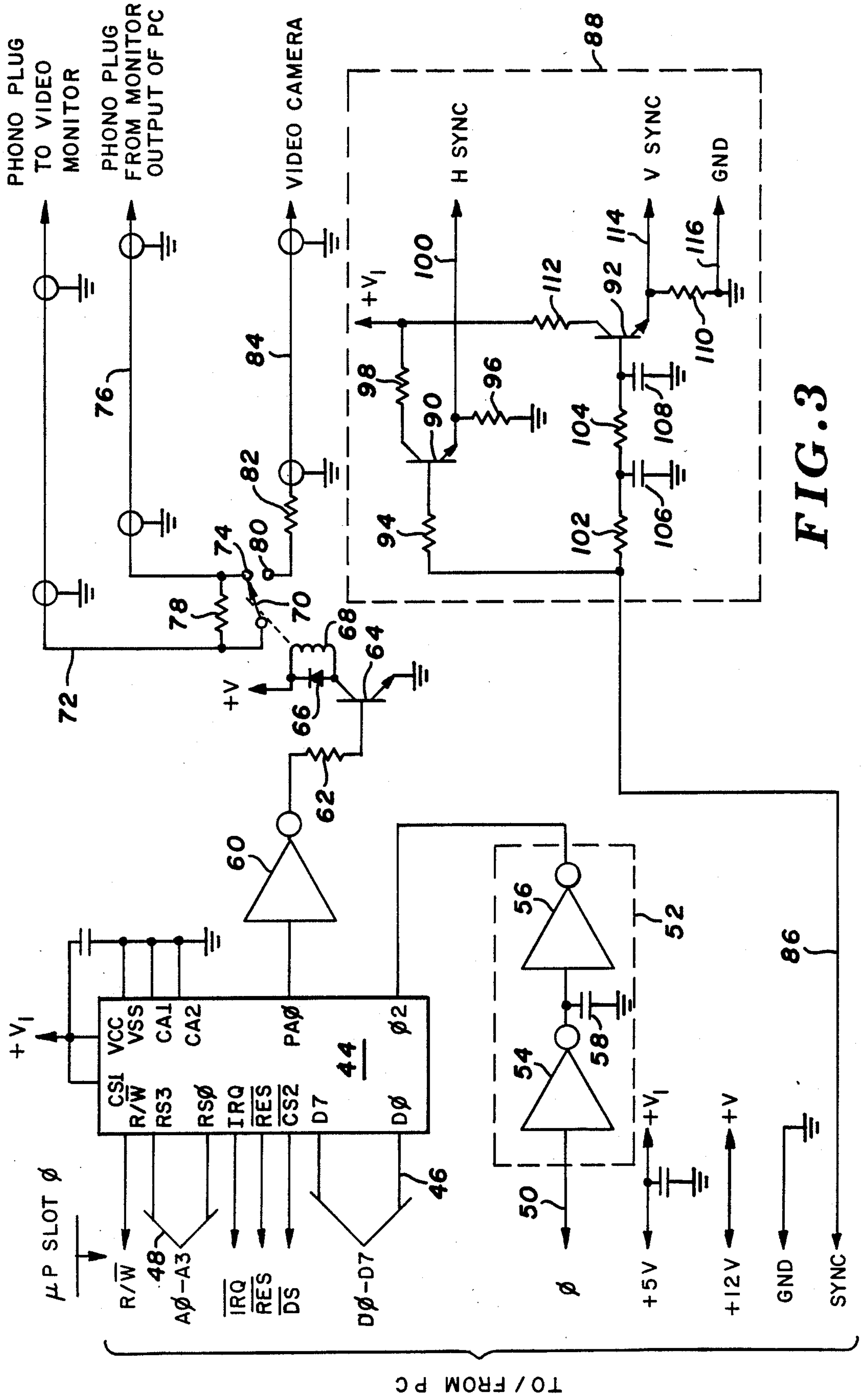
FIG. 3 is a schematic electrical diagram of the camera/monitor interface circuit of FIG. 2.

The circuitry for implementing the interface module 36 of FIG. 2 is set out schematically in FIG. 3. It is seen to include an interface adapter integrated circuit chip 44 which, in the preferred embodiment, comprises a Type SY-65C22 manufactured by Synertek, Inc. This chip includes two 8-bit bi-directional ports whereby peripheral devices can be controlled. Each line can be programmed as either an input or an output. It is possible to control several I/O lines directly from interval timers for generating programmable frequency square waves or for counting externally generated pulses. The chip also includes an interrupt flag register, and interrupt enable register and a pair of function control registers to facilitate control of peripheal circuitry by the microprocessor with which the interface adapter chip 44 is used.

As shown in FIG. 3, the chip 44 is adapted to be connected to a I/O slot of the computer/keyboard 28. More particularly, the integrated circuit chip 44 is arranged to be coupled to the 8-bit data bus of the microprocessor by way of the data cable 46. The chip's access control lines RS-0 through RS-3 are arranged to be coupled to the microprocessor's address bus via the cable 48. The chip 44 also receives a clock input signal from the microprocessor, via clock line 50. The line 50 is connected to the input of a pulse stretching circuit 52, here shown as including serially connected inverters 54 and 56, and a timing capacitor 58 which is connected between the output of the inverter 54, the input of inverter 56 and ground. The output of inverter 56 is coupled to the 2 input of the interface adaptor chip 44.

The output from the interface adaptor chip 44 is obtained at its terminal (port A, line zero) labeled PA-0 and is applied to the input of an inverter 60 whose output is coupled through a series resistor 62 to the base or control electrode of an NPN transistor 64. The emitter of this transistor is connected to ground and its collector is coupled through a parallel combination of a diode 66 and a relay coil 68 to a point of positive potential +V. The relay 68 includes a single pole, double-throw switch 70, the pole of which is connected by a conductor 72 to a phone plug input to the video monitor. The contact 74 of the switch 70 is connected by a coaxial conductor 76 to a phone plug which is adapted to fit into the conventional monitor output plug receptacle of the personal computer 28. A resistor 78 joins the pole terminal of the switch 70 to the contact 74. The remaining contact 80 of the relay switch 70 is coupled through a resistor 82 and a coaxial line 84 to the camera 22.

It can be seen, then, the personal computer 26 can select the PA-0 line output of the interface chip 44 so as to cause a signal determined by the input on the data lines 46 to control the conductivity state of the NPN transistor 64 and, in turn, the position of the switch 70.

When the relay switch 70 is in the position illustrated, it will be the composite video signal appearing at the monitor output of the personal computer 28 which is effectively coupled to the video monitor 32. When the switch 70 is in the alternate position, i.e., with the contactor of the switch abutting the contact 80, the composite video signal from the video camera 22 will be applied to the monitor 32. The resistor 78 allows the simultaneous presentation of both video camera signals and composite video signals from the personal computer to be simultaneously presented to the video monitor. Of course, if the personal computer is not presenting data on its monitor output, only the signals from the video camera will be displayed on the monitor.

With continued reference to FIG. 3, next to be explained is the manner in which the camera presentation can be synchronized with the video information from the personal computer. The sync line 86 is tied to the personal computer and the sync signal appearing thereon is then fed to a sync separator network shown enclosed by broken line box 88. The sync separator circuit is seen to comprise first and second NPN transistors 90 and 92. The base electrode of the transistor 90 is coupled through a resistor 94 to the sync line 86 and the emitter electrode thereof is coupled through a resistor 96 to ground. The collector of the transistor 90 is coupled through a resistor 98 to a source of positive voltage $+V_1$. The horizontal sync signal is taken at the emitter terminal of the transistor 90 and appears on line 100. The sync line 86 is also coupled through a pair of series coupled resistors 102 and 104 to the base electrode of the transistor 92. Capacitors 106 and 108 are coupled respectively between ground and the common terminal between the resistors 102 and 104 and between ground and the common terminal between resistor 104 and the base electrode of the NPN transistor 92. The emitter electrode of transistor 92 is coupled through a resistor 110 to ground while its collector electrode is coupled through resistor 112 to the voltage source $V_1$. The vertical sync signal is developed on line 114. As already mentioned, the lines 100 and 114 as well as a ground line 116 connect to the video camera.

The circuit of FIG. 3 thus allows graphics information developed in the personal computer to be superimposed over a video image generated from the video camera 22. This makes it unnecessary in the assembly application described above for the personal computer to provide a pictorial of the subassembly being worked upon at the work station. Instead, only a limited amount of computer generated graphics needs to be developed when it is considered that the rest of the subassembly can be presented on the monitor by way of the video camera.

It can thus be seen that there has been shown and described a system for facilitating the manufacture of finished subassemblies from component parts at a work station which allows alpha-numeric information and other graphics originated at a personal computer at the work station to be alternately or simultaneously displayed on the face of a CRT monitor with a video presentation of the assembly being worked on. This greatly simplifies the assembly operation and allows personnel with limited training to assemble complex electronic, electromechanical or mechanical parts.

This invention has been described herein in considerably detail in order to comply with the Patent Statutes and to provide those skilled in the art with the information needed to apply the novel principles and to construct and use such specialized components as are required. However, it is to be understood that the inventinon can be carried out by specifically different equipment and devices, and that various modifications, both as to equipment details and operating procedures, can be accomplished without departing from the scope of the invention itself.

What is claimed is:

1. A system for faciliatating the manufacture of finished subassemblies from component parts at a work station, comprising:

(a) a video camera positioned to view the area in said work station where said subassemblies are to be constructed;

(b) personal computing means located at said work station including manual data entry means and having an internal memory, an address bus, a data bus, a monitor output and a visual display terminal connected to said monitor output;

(c) external memory means addressable by said personal computing means for storing prestored data defining the positioning and the sequence of operations to be followed in selecting and joining said component parts in fabricating said subassemblies; and (d) selector means for coupling said video camera and said monitor output of said personal computing means to said visual display terminal for effectively simultaneously displaying both the pictorial image of said area in said work station being observed by said video camera and alpha/numeric and graphics information originating at said personal computing means on said visual display terminal.

2. The system as in claim 1 wherein said selector means comprises:

(a) pulse responsive electronic switching means for selectively connecting the input of said visual display terminal to the output of said video camera and to said monitor output of said personal computer; and (b) interface adapter means having a plurality of input lines coupled to and data bus and to said address bus of said personal computer and an addressable output line coupled in driving relation to said pulse responsive electronic switching means.

3. The system as in claim 2 and further including a sync separator circuit for receiving composite sync pulses from said personal computing means and for providing horizontal and vertical sync pulses to said video camera, whereby both said personal computer monitor output and said video camera output are synchronized with said visual display terminal.

4. A method of facilitating the manufacture of a product from elemental components comprising the steps of:

(a) positioning a subassembly of said product at a work station where said work station includes (i) a supply of said elemental components, (ii) a video camera positioned to view said subassembly, and (iii) a personal computing means having a video display terminal, a keyboard and a digital data storage means connected to said personal computing means, said digital data storage means including prestored alpha/numeric and graphics information relating to the order, location and manner in which said elemental components are to be added to said subassembly;

(b) simultaneously presenting on a said video display terminal scan a video image of said subassembly and alpha/numeric and graphics information stored in said digital data storage means;

(c) manually selecting said elemental components from said supply as directed by said alpha/numeric information and attaching said selected elemental components to said subassembly at locations identified by said video-image and said graphics information; and (d) repeating steps (b) and (c) until all specified elemental components have been added to said subassembly.

* * * * *

UNITED STATES PATENT AND TRADEMARK OFFICE

CERTIFICATE OF CORRECTION

PATENT NO. : 4,958,297

DATED : September 18, 1990

INVENTOR(S) : James K. Hansen

It is certified that error appears in the above-identified patent and that said Letters Patent is hereby corrected as shown below:

Column 6, Line 43, delete the first occurrence of the word "and" and replace it with -- said --.

Signed and Sealed this

Twenty-eighth Day of January, 1992

*Attest:*

HARRY F. MANBECK, JR.

*Attesting Officer*

*Commissioner of Patents and Trademarks*